US008650186B2

(12) United States Patent
Beck et al.

(10) Patent No.: US 8,650,186 B2
(45) Date of Patent: Feb. 11, 2014

(54) SYSTEMS AND METHODS FOR ANALYZING REQUIREMENTS

(75) Inventors: Andrew E. Beck, San Diego, CA (US);
Geoffrey Boeing, San Diego, CA (US);
Debra L. Shannon, San Diego, CA (US)

(73) Assignee: Accenture Global Services Limited, Dublin (IE)

( * ) Notice: Subject to any disclaimer, the term of this patent is extended or adjusted under 35 U.S.C. 154(b) by 113 days.

(21) Appl. No.: 12/846,895

(22) Filed: Jul. 30, 2010

(65) Prior Publication Data

US 2012/0030198 A1 Feb. 2, 2012

(51) Int. Cl.
*G06F 7/00* (2006.01)
*G06F 17/30* (2006.01)

(52) U.S. Cl.
USPC .......................................... 707/723; 707/771

(58) Field of Classification Search
USPC ......... 707/706, 708, 711, 723, 731, 737–739, 707/771, 999.001–999.01, 999.101, 707/999.107, 999.2–999.206
See application file for complete search history.

(56) References Cited

U.S. PATENT DOCUMENTS

| 6,038,560 | A | 3/2000 | Wical |
| 7,272,594 | B1 * | 9/2007 | Lynch et al. ........................... 1/1 |
| 2002/0111941 | A1 * | 8/2002 | Roux et al. ......................... 707/3 |
| 2003/0041058 | A1 * | 2/2003 | Ibuki et al. ......................... 707/4 |
| 2003/0227487 | A1 * | 12/2003 | Hugh ............................. 345/777 |
| 2006/0020629 | A1 * | 1/2006 | Ramani et al. ............. 707/104.1 |
| 2006/0064431 | A1 | 3/2006 | Kishore et al. |
| 2007/0198480 | A1 * | 8/2007 | Hogue et al. ....................... 707/3 |
| 2007/0276858 | A1 * | 11/2007 | Cushman et al. ............. 707/102 |
| 2010/0228726 | A1 * | 9/2010 | Slinker et al. ................. 707/723 |
| 2011/0282750 | A1 | 11/2011 | Rosen |
| 2012/0030210 | A1 | 2/2012 | Sankhla et al. |
| 2012/0102064 | A1 | 4/2012 | Becker et al. |

FOREIGN PATENT DOCUMENTS

| EP | 1061461 | 12/2000 |
| WO | PCT-2004/086255 | 10/2004 |

OTHER PUBLICATIONS

Ellen M. Voorhees, Query Expansion Using Lexical-Semantic Relations, Siemens Corporate Research, Inc. (1994) (9 pages).
European Patent Office, Communication, App. No. 11175662.3, Dated Oct. 5, 2011 (10 pages).
Australian Government, IP Australia, Patent Examination Report No. 1, dated Aug. 8, 2012, in Patent Application No. 2011204935 (3 pages).

* cited by examiner

*Primary Examiner* — Hosain Alam
*Assistant Examiner* — Reza Hosseini
(74) *Attorney, Agent, or Firm* — Finnegan, Henderson, Farabow, Garrett & Dunner, LLP

(57) ABSTRACT

The present disclosure relates to systems and methods for improving the management of requirements in systems and systems of systems. Multiple requirements databases may be interfaced, and language processing tools may be used to identify requirements having related content. The relevancy of requirements may be based on the semantic distance between terms in the network, their semantic relations, the number of related terms in the requirements, etc. A user may be presented with a navigable cross-section of requirements data relevant to search terms. Thus, added visibility and ease of access is provided for systems and systems of systems.

26 Claims, 13 Drawing Sheets

SYSTEMS AND METHODS FOR ANALYZING REQUIREMENTS

STATEMENT CONCERNING U.S. GOVERNMENT FUNDING

This invention was made with Government support under Contract N00178-05-D-4450 awarded by the Department of Defense. The Government has certain rights in this invention.

FIELD OF THE INVENTION

The present disclosure is generally related to systems and methods for analyzing partially structured data pertaining to large systems and systems of systems.

BACKGROUND OF THE INVENTION

Large systems and systems of systems may confront analysts with hundreds or thousands of system requirements which may be distributed across multiple heterogeneous databases. This can make finding requirements relevant to a specific task a significant challenge. Individual systems are becoming more complex, and there is increasing focus on what are called "systems of systems." System of systems are combinations or syntheses of multiple systems, each of which is capable of or designed for independent functioning. To further complicate things, many single systems are not built in anticipation of functioning within a system of systems.

Because requirements may be developed by separate contractors and distributed across multiple databases organized for different component systems, rather than the system of systems as a whole, it can be difficult to search or browse through numerous requirements in a coherent and unified manner. For example, different databases created by different entities for different purposes at different times may describe related requirements in different terminology and with a different organizational scheme. Further, systems engineers are often not granted "write" access to the systems with which they work, and thus they are not able to change and regularize data entries in order to unify unharmonious data.

SUMMARY OF THE INVENTION

Some requirements management applications allow users, such as human analysts, to create static or "hard" links between parent and child requirements. These products are designed for organizing the requirements of a single system according to a design hierarchy, but they suffer major limitations, especially when used for large systems and systems of systems. They generally permit only a single, static organization of requirements, which is problematic because analysts often need to see requirements from perspectives other than design (e.g., financial, schedule, service, etc.). Also, in such systems the task of finding related requirements can only be accomplished by navigating hard links or via simple text searches, which is time consuming and unlikely to be comprehensive. For example, a text search for the term "tire" may miss requirements using the term "wheel." Further, automated searching for related requirements across multiple databases is simply not possible with commercially available tools. Even if databases for separate systems could be connected by means of hard links, not only would this be a complicated and time consuming task, but it would conflict with the basic purpose of hard links—to organize requirements according to a system design hierarchy.

The present disclosure describes techniques for allowing access to multiple and potentially discrete requirements databases in a manner that preserves the unity, internal organization, and integrity of the underlying data, while still offering comprehensive access to the entire body of requirements.

As described herein, a system for analyzing requirements data may be provided, comprising a requirements database storing partially-structured data related to a subject matter domain; a semantic network linking partially-structured data in the requirements database to related data; and an analytic tool, comprising a user interface configured to receive a query from a user; and an analyzer configured to parse the query into search terms; identify related terms in the semantic network; identify a requirement in the requirements database that contains at least one related term; and provide the requirement to the user.

Further, a method may be implemented for analyzing requirements data, comprising receiving a search query comprising search terms; accessing a semantic network to add related terms to the search terms, wherein at least one of the related terms was not included in the search terms; comparing the search terms and related terms to requirements data in a requirements database; identifying a requirement in the requirements database including at least one search term and at least one related term; and providing the identified requirement to a user via a computer device.

Also, a method may be implemented for analyzing requirements data, comprising receiving a search query comprising a requirement; comparing the textual content of the requirement to a requirements database; identifying a requirement in the requirements database, wherein the identified requirement has at least one term in common with the textual content of the requirement; identifying a soft link between the identified requirement and a linked requirement; and providing the linked requirement to a user via a computer device.

The present disclosure also describes a computer-readable storage medium comprising a plurality of code segments, comprising a code segment for receiving a search query comprising search terms; a code segment for accessing a semantic network to add related terms to the search terms, wherein at least one of the related terms was not included in the search terms; a code segment for comparing the search terms and related terms to requirements data in a requirements database; a code segment for identifying a requirement in the requirements database including at least one related term; and a code segment for providing the identified requirement to a user via a computer device.

Additional objects and advantages will be set forth in part in the description which follows, and in part will be obvious from the description, or may be learned by practice of the invention. These objects and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments which, together with the description, serve to explain the principles of the invention.

DESCRIPTION OF THE EMBODIMENTS

Reference will now be made in detail to several exemplary embodiments. Wherever possible, the same reference numbers will be used throughout the drawings to refer to the same or like parts.

Figure 1A:
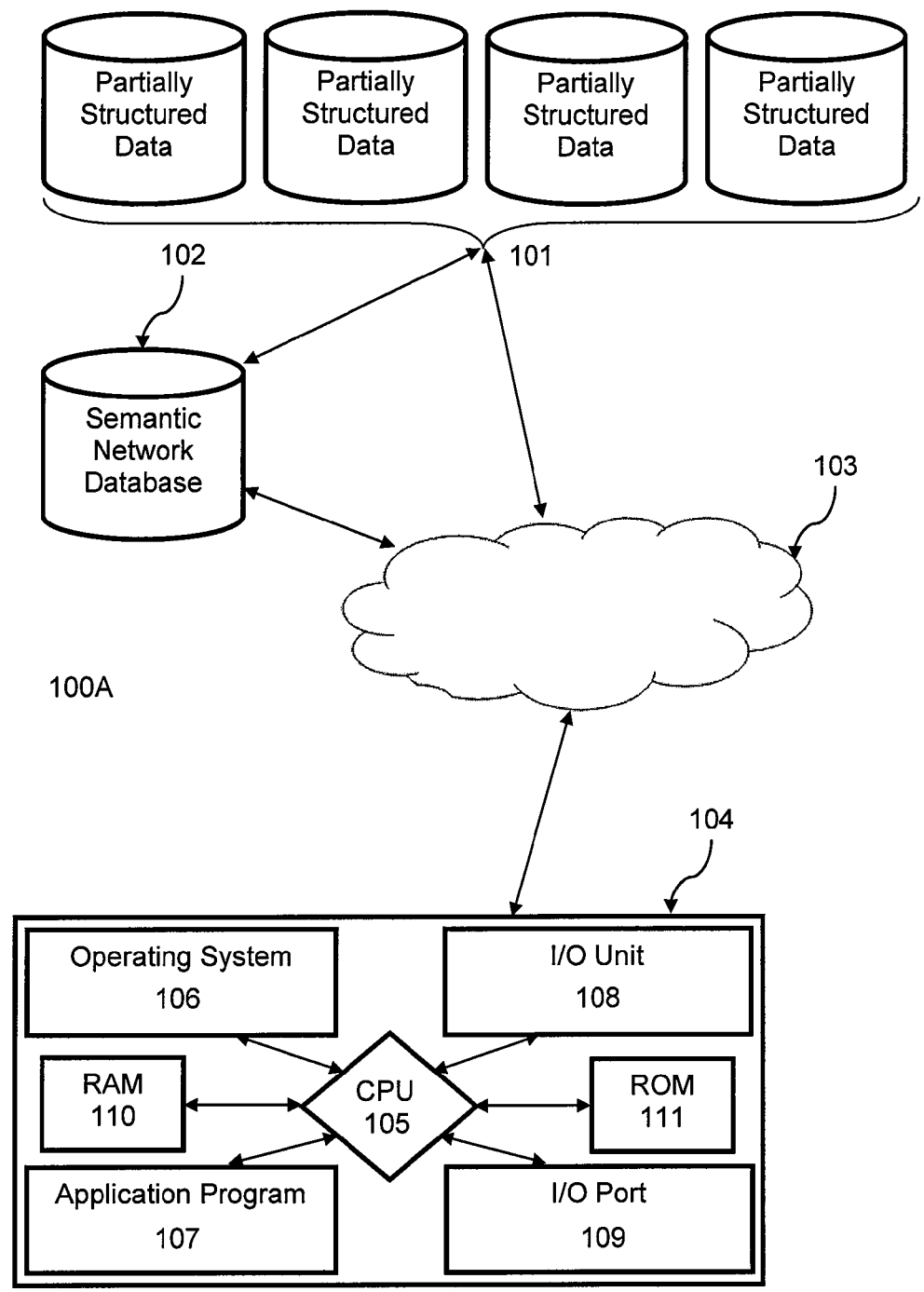
FIG. 1A depicts an exemplary system for implementation of methods and techniques described herein.

FIG. 1A depicts an exemplary system 100A for implementing methods and techniques described herein. System 100A may include one or more databases 101 comprising partially structured data or combinations of partially structured data and/or fully structured data and/or unstructured data. Structured data generally refers to data that is ordered and organized according to specific characteristics of the data. An example of structured data is a spreadsheet listing products in one column, prices in another column, sales in another column, profits in another column, etc. Basic structured data sources may be constructed in Microsoft Excel®, Word Perfect Quattro Pro®, Apple Numbers®, etc. Unstructured data, by contrast generally includes data without computer-discernable organization. Examples of unstructured data include images, newspaper articles, novels, etc.

Partially structured data (or "semi-structured data") generally corresponds to data with a level of organization somewhere between that of fully structured data and unstructured data. One type of partially structured data may include data where rows or columns in a database include free-flowing text (e.g., terms, phrases, full sentences, paragraphs, etc.), and the rows or columns are organized so that data in the rows or columns is of the same type. For example, a product requirements database may include one requirement or several closely related requirements in each row. The requirements may be written concisely (e.g., "A-16 screw=flat headed, proof strength 85 ksi, yield strength 92 ksi, tensile strength 120 ksi") or more formally (e.g., "The screw for use at point A-16 must be flat headed, have a proof strength of 85 ksi, a yield strength of 92 ksi, and a tensile strength of 120 ksi."). Other examples of partially structured data may include rows or columns in a database comprising driving directions, scholarly article titles or abstracts, patent titles or abstracts, news headlines, book chapter titles, email subject lines, Twitter Tweets®, text messages, etc.

Databases 101 may comprise one or more logically and/or physically separate databases. Databases 101 may run database software, which may be written in, e.g., SQL, .QL, CQL, COQL, XPath, MDX, QUEL, DMX, etc. In some embodiments, databases 101 may be maintained by one organization, and in other embodiments, multiple organizations may maintain databases 101. The partially structured data in databases 101 may be written in a unified manner (e.g., referring to the same things in the same terminology), or may be written in a colloquial or unique manner. In some embodiments, databases 101 may contain misspellings, redundancies, conflicting data (e.g., conflicting product requirements), empty data entries, and/or outdated data entries. The number of individual entries (e.g., cells or database entries, etc.) in databases 101 may be relatively few (e.g., <100) or numerous (e.g., >10,000,000).

System 100A may also include a semantic network database 102. Semantic network database 102 may contain various types of semantic data. For example, in an embodiment relating to product requirements management, semantic network database 102 may include various terms used in products requirements, as well as related terms. The related terms may include synonyms, antonyms, and other related words. For example, if databases 101 relate to ship requirements, semantic network database 102 may include various terms used in the ship requirements, as well as related terms. If, for instance, one of the requirements in databases 101 concerned a ship's "rudder" system, semantic network database may include the term "steering oar" as a synonym or equivalent colloquial expression. Semantic network database 102 may also include terms relating to a "rudder" system, such as "pintle," "sternpost," "gudgeon," etc.

In some embodiments, semantic network database 102 may include related terms that have a relationship to a requirements term in databases 101. For example, related terms in semantic network database 102 may relate to product parts which must be replaced when replacing another part, that concern requirements dependent upon other requirements, etc. As an example, if databases 101 contained data relating to automotive seatbelt requirements, semantic network database 102 may include requirements concerning seatbelt fasteners, buckle mechanisms, braking sensors, antilock brake computer equipment, etc., because a change in one aspect of a seatbelt may lead to or necessitate changes in other associated components of an automobile.

In some embodiments, subject matter experts or technicians familiar with requirements and the products they relate to may specify data to be included in semantic network database 102. For example, experts or technicians may be given questionnaires or surveys in which they are asked to list related terms for specific requirements terms. Alternatively or additionally, experts and technicians may be asked to indicate requirements that are likely to be impacted by changes to other requirements. In other embodiments, some or all of the data in semantic network database 102 may be derived by automated means. For example, by monitoring search engine results, or call center troubleshooting inquiries, one may use statistical techniques to determine the association between requirements terms and related terms. As an example, monitoring of search results may reveal that in 90% of instances, users who click on a webpage for airplane steering troubleshooting arrived at the page after searching for either "yoke" or "joystick". In such circumstances, "yoke" and "joystick" may be deemed related terms. As another example of automated gathering of data for semantic network database 102, thesauruses, dictionaries, or glossaries related to certain products may be a useful source of data. For instance, a glossary may indicate that an airplane's "yoke" is also referred to as a "control column."

Semantic network database 102 may comprise one or more logically and/or physically separate databases. Semantic network database 102 may run database software, which may be written in, e.g., SQL, .QL, CQL, COQL, XPath, MDX, QUEL, DMX, etc. In some embodiments, semantic network database 102 may be housed in the same storage medium as one or more of databases 101 (e.g., network attached storage, storage area network, personal computer hard drive, etc.), or may be housed separately. Semantic network database 102 may be maintained by the same organization that maintains one or more of databases 101, or by another organization. Database 102 may communicate directly with database 101, or may communicate with databases 101 indirectly, for example, via a network 103. In some embodiments, database 102 may be included in one or more of databases 101. Database 102 is discussed further below.

Network 103 may include an internet, intranet, or other network connection, as well as variations thereof (e.g., a cloud computing arrangement). In some embodiments, database 102 and database 101 may be behind the same firewall, and in other embodiments each may have its own firewall between it and network 103.

System 100A may also include computing device(s) 104. Computing device 104 (e.g., a personal computer, laptop, server, PDA, cellular phone, etc.) may communicate with semantic network database 102 and databases 101 via network 103, as shown in FIG. 1A, or it may communicate directly with database 102 and databases 101 via network 103, as shown in system 100B in FIG. 1B. Computing device 104 may include one or more operating systems 106 (e.g., Microsoft Windows XP®, Microsoft Windows 7®, Mac OS X®, Linux, etc.), one or more application programs 107 (e.g., a program containing instructions to execute the processes described herein), one or more I/O units (e.g., a mouse, trackball, keyboard, monitor, etc.), and one or more I/O ports 109 (e.g., Ethernet (IEEE 802.3), telephone, Wi-Fi (IEEE 802.11), cellular, audio, video, etc.). Operating system 106, application program 107, I/O unit 108, and I/O port 109 may be controlled by one or more CPUs 105 (e.g., microprocessors, microcontrollers, etc.). In addition, computing device 104 may comprise one or more RAM 110 and ROM 111 storage media.

Figure 2:
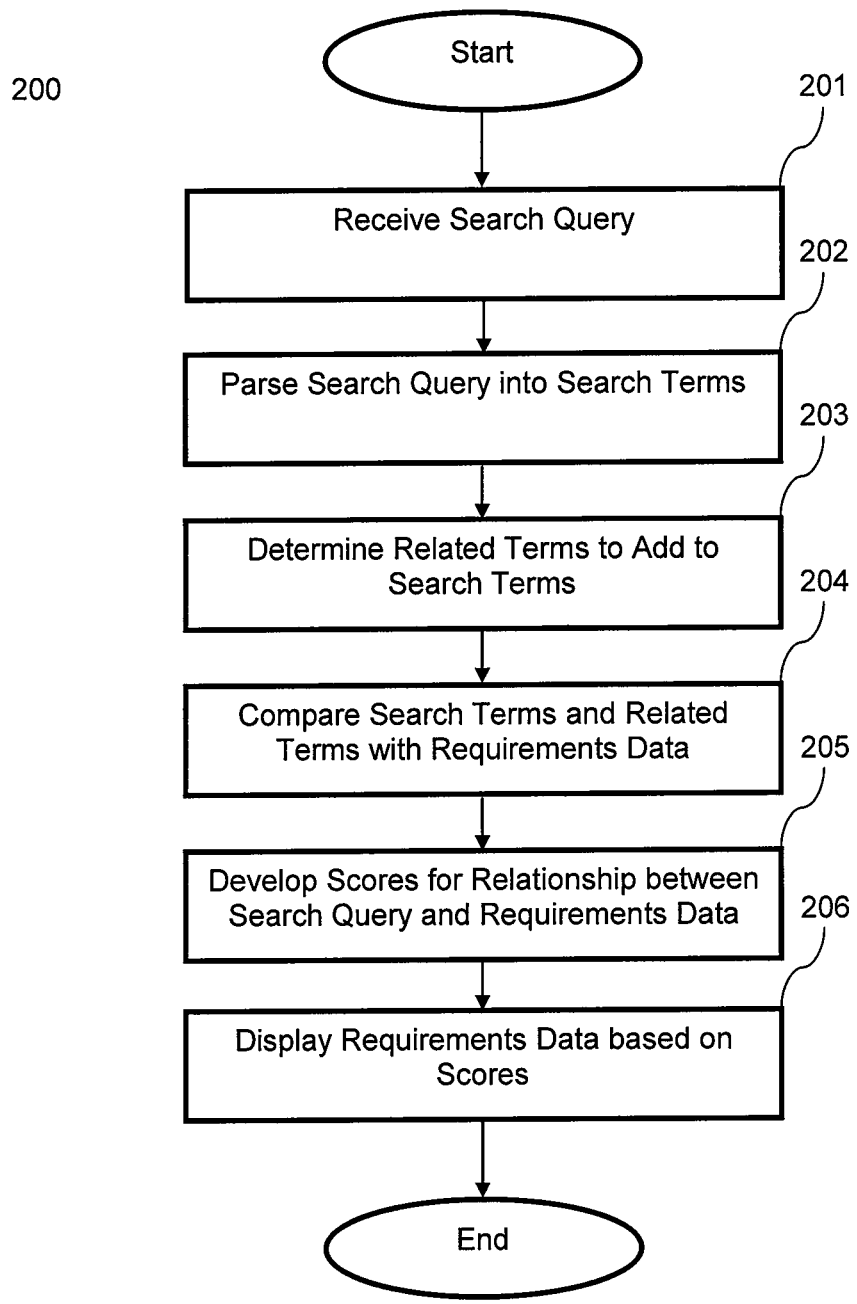
FIG. 2 depicts an exemplary process of searching for requirements data.

FIG. 2 depicts an exemplary process 200 for searching for requirements data. In some embodiments, process 200 may utilize semantic search middleware, such as Autonomy IDOL®, Microsoft FAST®, Cogito SIMS®, etc. In some embodiments, process 200 may include a step 201 of receiving a search query. The search query may comprise numbers and/or words. In other embodiments, as discussed below, the search query may comprise requirements themselves. Search queries received in step 201 may include simple text (e.g., "periscope lens" or "15 inch periscope lens"), Boolean operators (e.g., "periscope & lens" or "15 AND inch AND periscope AND lens"), special operators (e.g., quotation marks to search for exact terms, "/n" to search within "n" words of another search term, "!" to include words with various end characters, etc.), etc. In embodiments relating to requirements management, the search query received in step 201 may comprise search terms relating to product parts in need of repair, replacement, modification, updating, etc.

Figure 3:
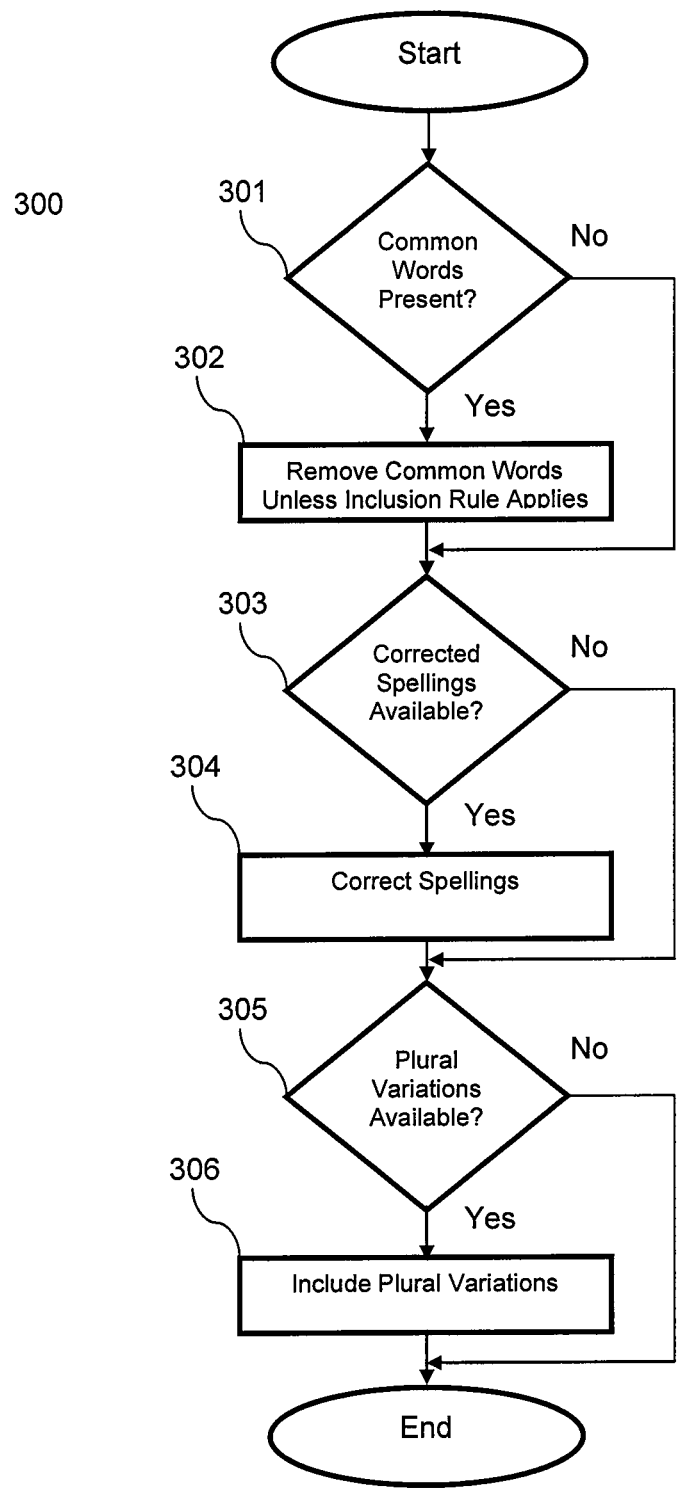
FIG. 3 depicts an exemplary process of regularizing search terms and/or related terms.

Process 200 may also include a step 202 of parsing a search query into search terms. In some embodiments, step 202 may simply identify each search term (e.g., "periscope" and "lens), and apply any special search features that were used (e.g., Boolean operators, special operators, etc.). In some embodiments, step 202 may include a process of regularizing search terms, as depicted in FIG. 3.

For example, in a process 300, the presence of common words (e.g., "and," "the," "of," "at," "for," etc.) may be detected in a step 301. In a step 302, common words may be removed from the search query, unless an inclusion rule, if any, applies. An example of an inclusion rule may be that words within quotation marks should not be removed in step 302. As another example, an inclusion rule may specify that words subject to special operators (e.g., "at /5 switch") should not be removed in step 302.

Process 300 may also include a step 303 of determining whether corrected spellings are available for any of the search terms. For example, step 303 may run a spell-checking routine that determines whether any words in the search query have a spelling that is not recognized. In some embodiments, the spell-checking routine may use statistical methods to identify probable misspellings or grammatical errors based on surrounding words.

In a step 304, if any misspellings or grammatical errors were detected in step 303, such errors may be corrected. The correction may occur automatically, or via asking the user whether the correction should be made.

Process 300 may also include a step 305 of checking for plural variations of search terms. For example, step 305 may determine whether non-plural search terms have plural variants, and vice versa. If plural or non-plural variants are identified in step 305, they may be included as search terms in a step 306. The inclusion of plural or non-plural variants may be done automatically or via asking the user whether the inclusion should occur. In some embodiments, step 305 may also include checking for other lexical variants, such as morphological variants, prefix variants, capitalization variants, spelling variants, etc. For example, the term "initialize" may be a spelling variant of "initialise," etc. Identified variants may be included as search terms in step 306.

Figure 4:
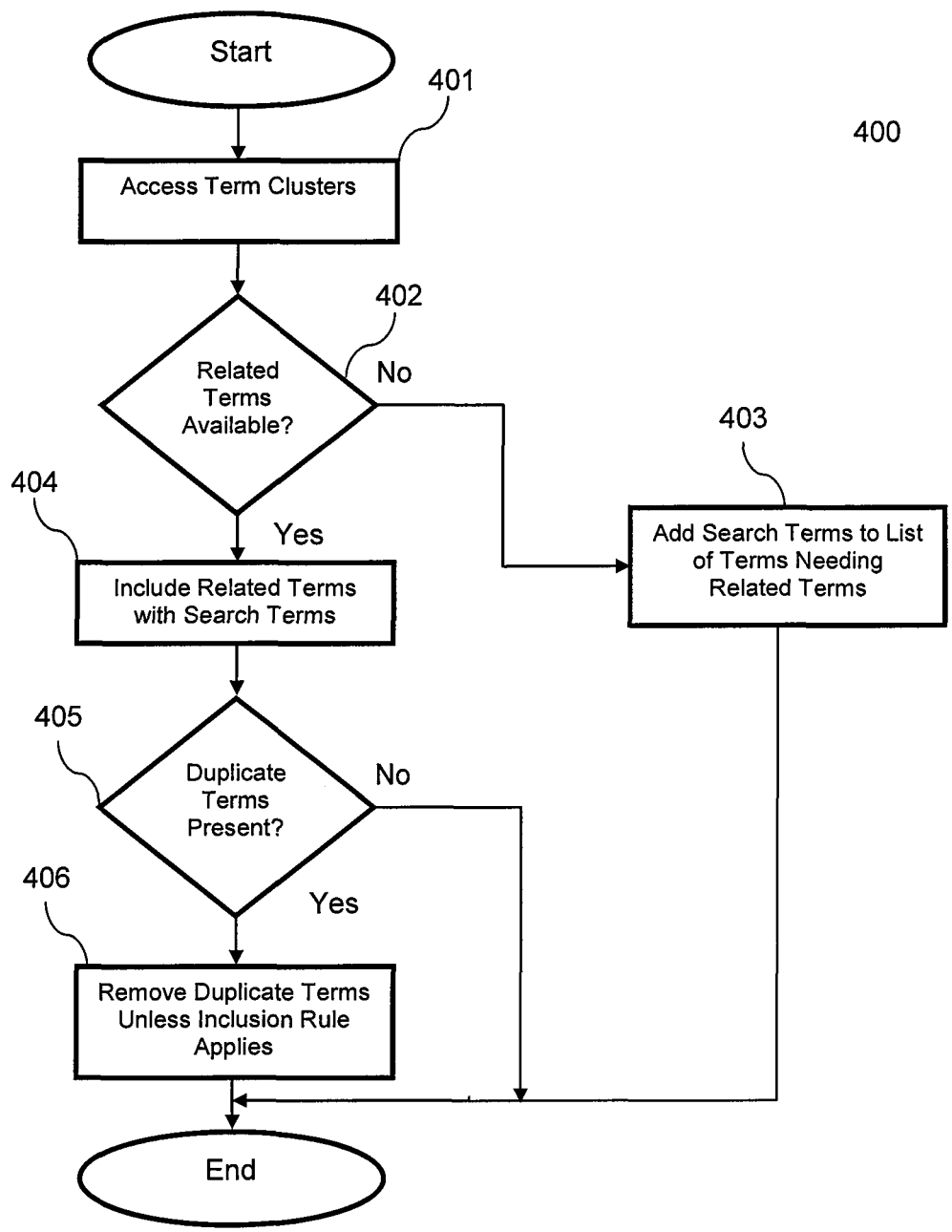
FIG. 4 depicts an exemplary process of including related terms with search terms.

With reference to FIG. 2, process 200 may also include a step 203 of determining related terms to add to the search terms. For example, FIG. 4 depicts an exemplary process 400 for determining whether to add search terms to a search query. Process 400 may include a step 401 of accessing term clusters. In some embodiments, with reference to FIGS. 1A and 1B, term clusters may be stored in database 102. The term clusters may represent groups of terms found in requirements that are related in terms of physical proximity in a product part, likelihood of needing replacement or adjustment if other terms in the cluster are involved in replacement or adjustment, etc.

Figure 5:
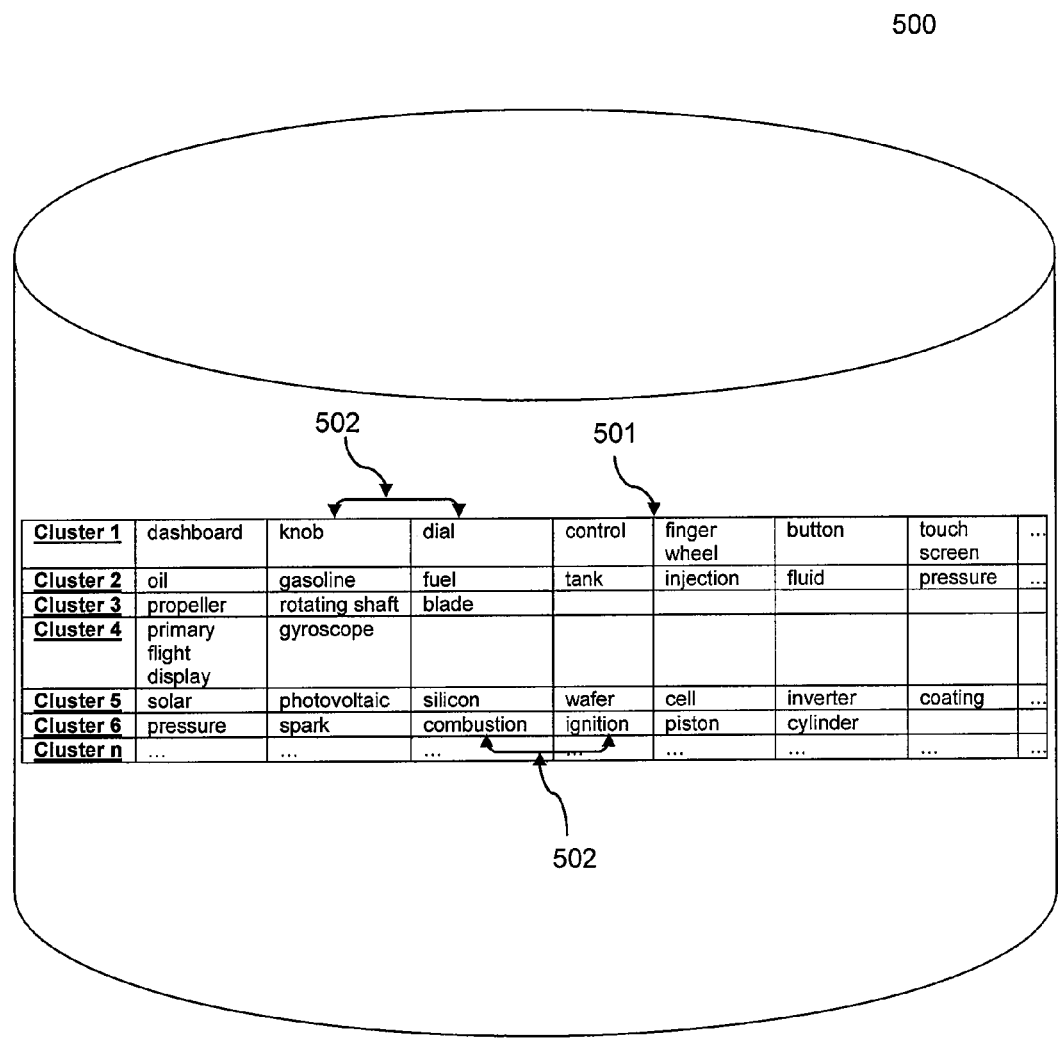
FIG. 5 depicts an exemplary data storage arrangement for term clusters.

For example, FIG. 5 depicts an exemplary data storage arrangement 500 of term clusters 501. Cluster 1, for instance, includes the terms "dashboard," "knob," "dial," "control," "finger wheel," "button," "touch screen," etc. Also, in Cluster 1, the terms "knob" and "dial" are identified as being a linked pair 502 of synonyms. Also, in Cluster 6, the terms "combustion" and "ignition" are identified as a linked pair 502 of synonyms. In some embodiments, linked pairs 502 of synonyms may include three or more terms, and in some embodiments, the synonyms may be synonymous in real-life usage, if not in dictionary usage. In additional embodiments, data storage arrangement 500 may also include data identifying the locations in requirements databases 101 in which requirements appear containing terms from term clusters 501. For example, data storage arrangement 500 may include pointers identifying the memory locations at which requirements are stored containing terms from clusters 501.

Process 400 may include a step 402 of determining whether related words are available for a specific search term. In some embodiments, step 402 may comprise querying the term clusters or other data in a semantic network database. If the semantic network database contains related terms, they may be included in the search query in a step 404. If no related terms are available, the search terms may be added to a list of terms in need of association with related terms in a step 403. For example, step 403 may generate a list of terms that subject matter experts and technicians can consider and develop related terms for, which can be stored in the semantic network database or another database.

Process 400 may also include a step 405, in which duplicate terms, if any, are identified. In some embodiments, step 405 may identify exact duplicates and automatically remove them from the query, unless an inclusion rule (as discussed above) applies. For example, if a search query includes the terms "injection," "throttle," and "intake," it is possible that the term "throttle" could have been identified as a related term for the term "injection" in step 402 and included in the search query in step 404. In such case, the term "throttle" may appear twice in the search query, and a duplicate appearance of the term may be removed in step 406. In some embodiments, similar terms (e.g., "injection" and "injector") may also be identified in step 405 and removed in step 406. The removal may be performed automatically, or by inquiring whether a user wishes to remove identified terms.

Figure 6:
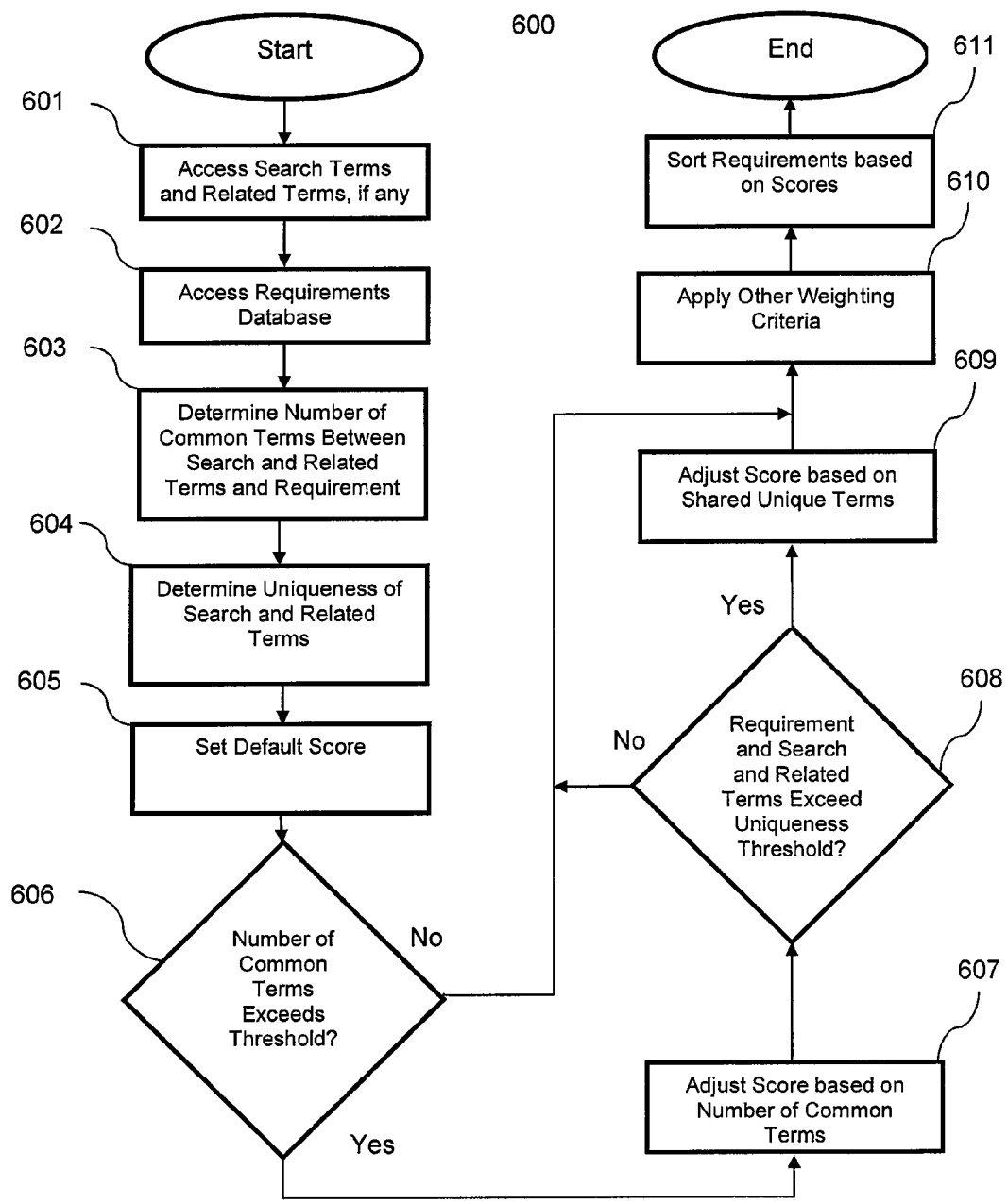
FIG. 6 depicts an exemplary process for comparing search terms and related terms to requirement data.

Returning to FIG. 2, process 200 may include a step 204, in which search terms and/or related terms (e.g., if added in step 203) are compared with requirements data. For example, FIG. 6 depicts an exemplary process 600 for comparing search terms and related terms to requirements data. Process 600 may include a step 601 of accessing search terms and related terms, if any. Exemplary processes for receiving search terms and determining whether to add related terms were discussed above. As indicated above, with reference to FIGS. 1A and 1B, accessing related terms may involve accessing a semantic network database 102.

Process 600 may also include a step 602, in which requirements databases are accessed. For example, with reference to FIGS. 1A and 1B, accessing requirements databases may involve accessing databases 101. In some embodiments, step 602 may comprise querying requirements databases to locate textual matches between search terms and requirements data. For example, a search with the word "catalytic converter" and related words "oxidation" and "carbon dioxide" may result in textual matches with requirements containing the terms "catalytic converter," "oxidation," and "carbon dioxide." Thus, although in this example the original search included only the word "catalytic converter," the inclusion of related terms ("oxidation" and "carbon dioxide") expanded the search query to include all three terms.

Process 600 may also include a step 603 of determining the number of common terms between a requirement and a search query. In some embodiments, step 603 may determine the number of common terms with respect to each entry in one or more requirements databases. In other embodiments, step 603 will only determine the number of common terms with respect to requirements containing at least one textual match with the search terms. For instance, for a search with the word "catalytic converter" and related words "oxidation" and "carbon dioxide" in step 603, process 600 may be configured to only determine the number of common terms with requirements including at least one of these terms.

Process 600 may also include a step 604 of determining the uniqueness of search terms (and related terms, if any). The uniqueness of a term, for example, may represent its infrequency among some or all terms in requirements databases, among all terms pertaining to a certain subject matter domain (e.g., automotive, maritime, microprocessors, etc.), among all terms in a language, etc. For instance, the uniqueness of a term may be quantified by ranking the frequency of incidence of terms in requirements databases from most frequent to least frequent. The most common word could receive a ranking of 100/100 and the least common word could receive a ranking of 1/100, with the remaining words falling in between. The rankings between 100/100 and 1/100 could be determined in direct proportion to their frequency of incidence, in accordance with a statistical model, etc. Alternatively or additionally, rankings may be determined based on frequency of incidence in dictionaries, technical glossaries, etc. In a plumbing requirements database, for instance, the term "pipe" may receive a higher ranking than the term "nipple" if the term "pipe" has a higher frequency of incidence.

Process 600 may also include a step 605 of setting default scores for relationships between search terms (and related terms, if any) and requirements data. A default score may represent a basic score than can be raised or lowered depending on characteristics of the search terms, related terms, and requirements data. In embodiments where final scores are scaled from 1-10, a default score may be set at, e.g., 5 (or, e.g., if 1-100, set at 50).

Process 600 may include a step 606 of determining whether the number of words that the search terms and related terms have in common with requirements data (e.g., as determined in step 603) exceeds a certain threshold. In some embodiments, the threshold may be automatically set such that at least a certain proportion of comparisons exceed the threshold. In other embodiments, users may adjust the threshold themselves. For example, if a user's search terms and related terms have very few terms in common with requirements data, the user may decide to lower the threshold, and vice versa. For instance, the user may lower the threshold from three terms in common to two terms in common. If the number of common terms does not exceed the threshold, process 600 may proceed to step 610, as further discussed below.

Process 600 may also include a step 607 of adjusting the score (e.g., the default score), based on the number of common terms (e.g., as determined in step 603). For example, point quotas may be determined for numbers of common terms. One example of a point quota may award 20 points if there are 10 or more common terms, 15 points if there are 5-9 common terms, 10 points if there are 3-4 common terms, etc. The points may be added to the default score (e.g., as determined in step 605). For example, if the search terms "voltage," "regulator," and "transformer," appeared in requirements data (e.g., a requirement for a transformer assembly) 10 times, 20 points may be added to the default score of 50, resulting in an adjusted score of 70.

Process 600 may also determine in step 608 whether search terms and related terms contain any unique terms in common with requirements data, and if so, whether the level of uniqueness exceeds a certain threshold. For example, the uniqueness of search terms, related terms, and requirements terms may be determined, for example, as explained with reference to step 604. In step 608, a threshold of uniqueness may be determined (e.g., 30/100 or 10/100), such that only terms with quantified levels of uniqueness will exceed the threshold (e.g., below 30/100 or below 10/100). Step 608 may also comprise determining whether any search terms exceeding the uniqueness threshold exist in both the search terms and/or related terms and the requirements data. For instance, if the uniqueness threshold was set at 10/100, and the uniqueness of three search terms were determined to be 41/100, 36/100, and 4/100, only the third search term would exceed the uniqueness threshold. Step 608 may then determine whether the third term was present in the requirements data. If not, process 600 may proceed to step 610, as discussed further below. If the third term was present in the requirements data, the score may be adjusted in a step 609 based on the presence of the common unique term. For example, scores may be raised by 20 points per common unique term, or scores may be raised in proportion to the uniqueness of a common term (e.g., the more unique the common term, the more points to be added to the score).

In some embodiments, process 600 may also include a step 610, in which various types of weighting criteria may be applied. For example, weighting criteria may determine how many times a term from the search terms and related terms is repeated in requirements data. For instance, if the search terms and related terms included the terms "torque," "moment," "fulcrum," and "angular momentum," and the term "fulcrum" appeared in a particular requirement a large number of times, additional weighting may be applied to increase the score associated with the requirement. The score may be increased, for example, in proportion to the number of times the term "fulcrum" is repeated in the requirement. As another example of additional weighting criteria, step 610 may determine the number of common synonyms between the search terms and related terms and the requirements data. In some embodiments, the score could be increased based on the number of synonyms identified.

Figure 1B:
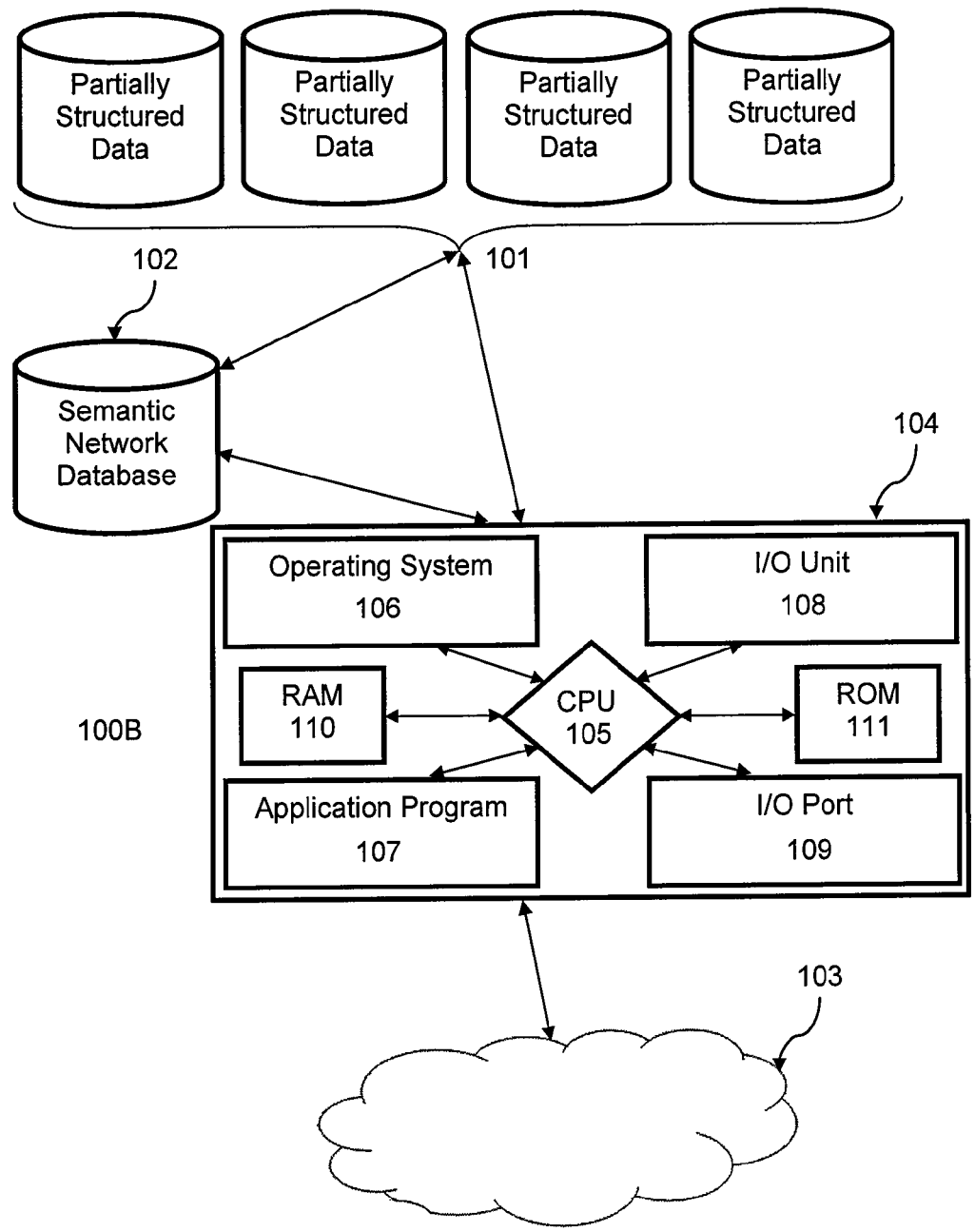
FIG. 1B depicts an exemplary system for implementation of methods and techniques described herein.

Process 600 may also include a step 611 of sorting requirements data by score. For example, after scores have been determined in process 600, and adjusted as appropriate, scores associated with particular requirements data may be sorted in order of score (e.g., highest to lowest). In some embodiments, step 611 may present the requirements with the highest scores first, thus indicating that they are most relevant to the search terms and related terms. For example, with reference to FIG. 2, step 206 of displaying requirement data based on scores may comprise displaying requirements in order from highest score to lowest score. With reference to FIGS. 1A and 1B, requirement data may be displayed via computer 104 (e.g., via I/O unit 108). As discussed further below, requirement data may be displayed via a user interface (e.g., a user searching interface, a user browsing interface, etc.).

Figure 7:
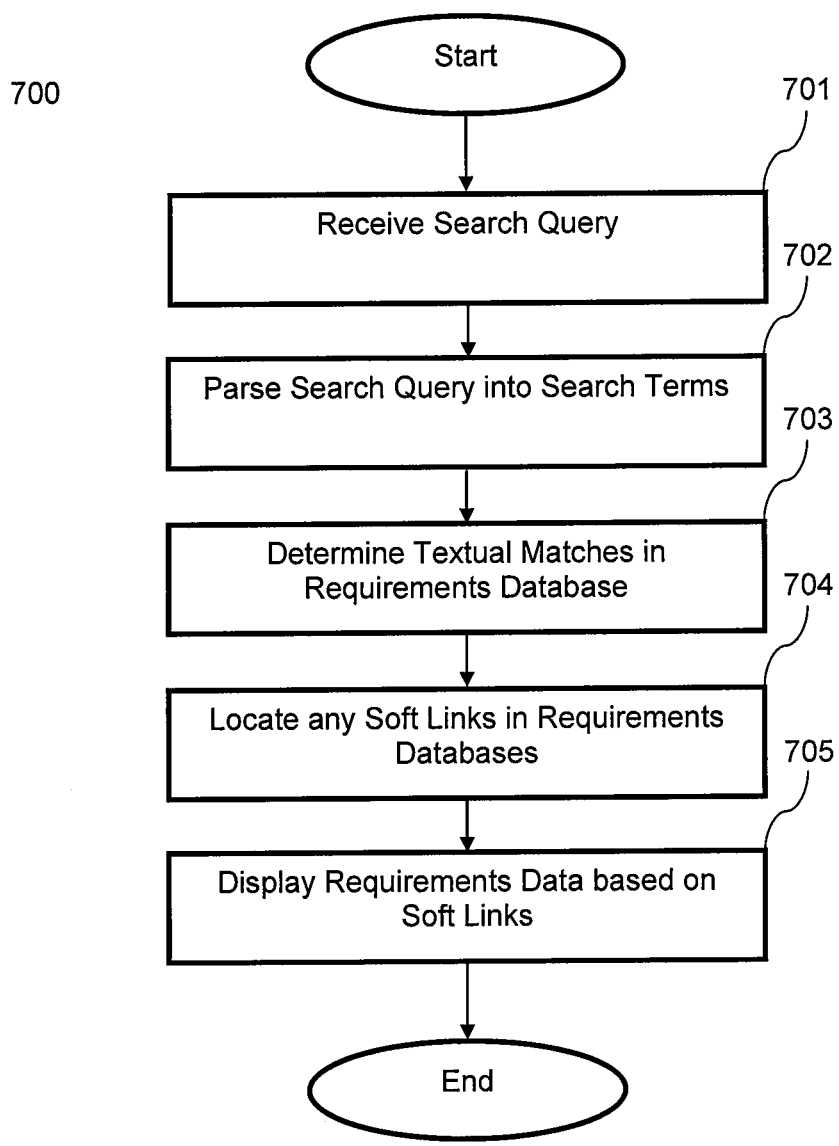
FIG. 7 depicts an exemplary process for searching for requirement data.

FIG. 7 depicts an exemplary process 700 of searching for requirements data. In some embodiments, process 700 may be implemented as an alternative to, or together with, process 200, as depicted in FIG. 2. Process 700 may include a step 701 of receiving a search query. A search query may comprise numbers and/or words, Boolean operators, special operators, etc.

Process 700 may also include a step 702 of parsing a search query into search terms. For example, parsing a search query may involve identifying separate search terms in a query, regularizing search terms (e.g., checking for misspellings, grammatical mistakes, plural variations, etc.), applying search operators, if any, etc.

Process 700 may also include a step 703 of determining textual matches between search terms and requirements data. For example, with reference to FIGS. 1A and 1B, step 703 may comprise querying requirements databases 101 to identify instances of search terms. Querying databases 101 may involve applying special search operators (e.g., Boolean operators) included with a search query. For example, a search for the term "flang!" may identify the terms "flange," "flanged," "flanges," "flanging," etc. in requirements databases 101.

Process 700 may also include a step 704 of locating soft links in requirements databases. Generally, soft links may represent associations between requirements in requirements databases. Soft links may be determined, for example, by experts or technicians, or by automated means, as discussed above with regard to semantic network database 102 of FIGS. 1A and 1B. For example, soft links may associate requirements that likely need to be considered together when modification or repair of a product part is performed. Soft links may also comprise term clusters, as discussed above with reference to FIG. 5.

In some embodiments, soft links may express a probability that two or more requirements are related (e.g., should be considered together, are interdependent, have similar lifespans, etc.). For example, two or more requirements with large numbers of related terms may be "soft linked" to each other. A soft link may be expressed as a state (e.g., "yes" or "no"), as a probability (e.g., 75% probability of relatedness), as a strength (e.g., 90/100, compared to other requirements), etc. In some embodiments, a soft link may be determined by deemphasizing certain aspects of requirements not deemed important (e.g., common words in requirements like "the" and "a"), may emphasize other aspects of requirements (e.g., unique terms, terms with only one relevant meaning, etc.), etc. It is possible for soft links to be developed between two or more requirements that share no terms with each other (or that share only common terms like "the" and "a"). For example, industry experts, technicians, or other resources may be utilized to determine related terms, synonyms, etc. that the requirements include. Thus, even if two or more requirements contain none of the same terms, a soft link may potentially be established between them if they are found to be related.

Figure 8:
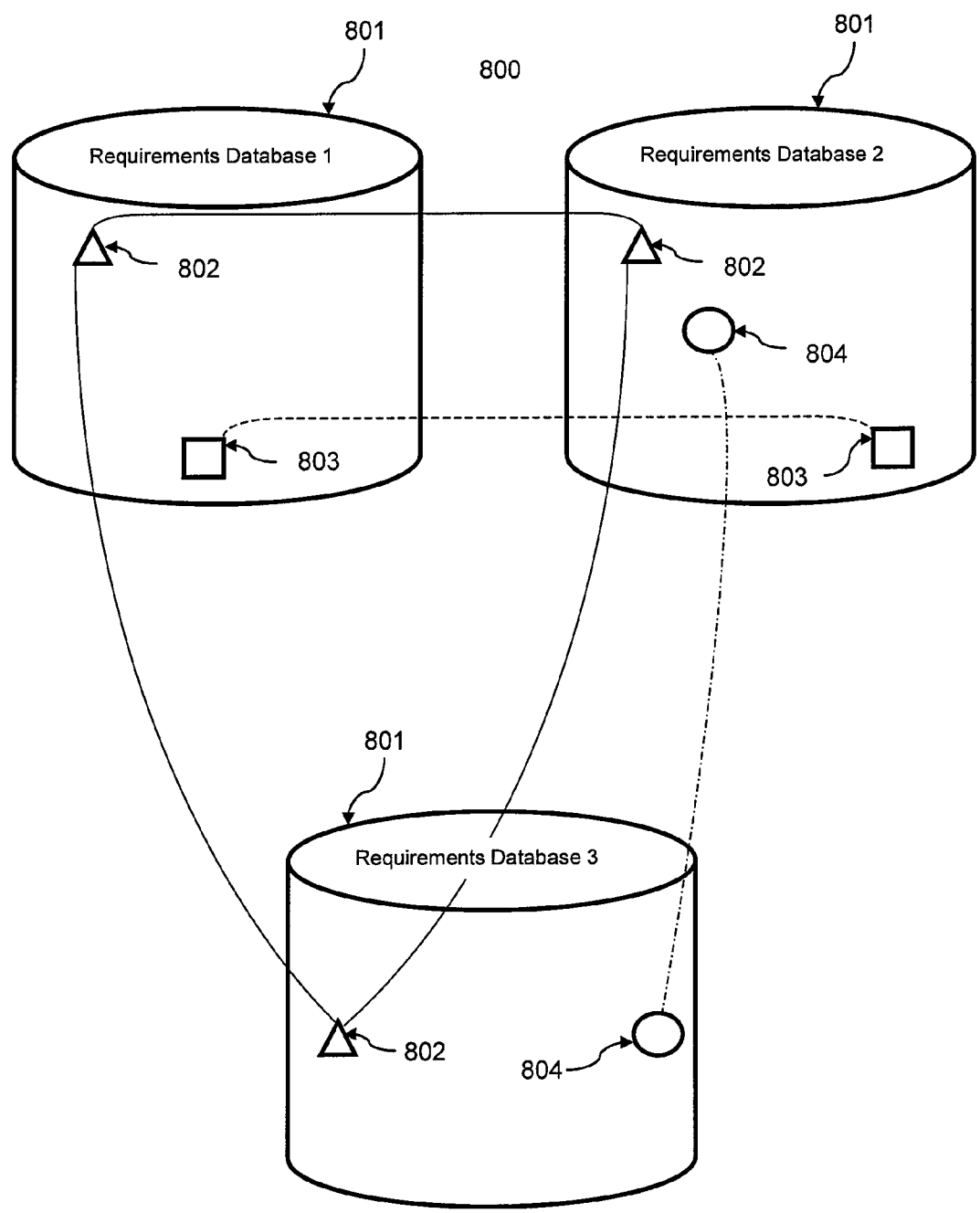
FIG. 8 depicts an exemplary data storage arrangement for soft links between requirements.

FIG. 8 depicts an exemplary data storage arrangement 800, in which soft links are illustrated among requirements databases 801. For example, in storage arrangement 800 each database that is shown includes one or more related requirements 802, 803, and 804, which are soft linked together. In some embodiments, one or more requirements databases 801 may contain no related requirements 802, 803, 804 that are soft linked together. As shown in FIG. 8, each requirements database 801 includes related requirements 802, 803, and 804, which are soft linked to at least one other requirement 802. Requirements Databases 1, 2, and 3 include related requirements 802, Requirements Databases 1 and 2 include related requirements 803, and Requirements Databases 2 and 3 include related requirements 804. Soft links between related requirements 802, 803, and 804 may be implemented by, e.g., storing pointers to memory locations storing related requirements, storing unique identifiers associated with related requirements, etc. The pointers or unique identifiers may be stored in requirements databases 801, in a semantic network database, or another type of database.

Figure 9:
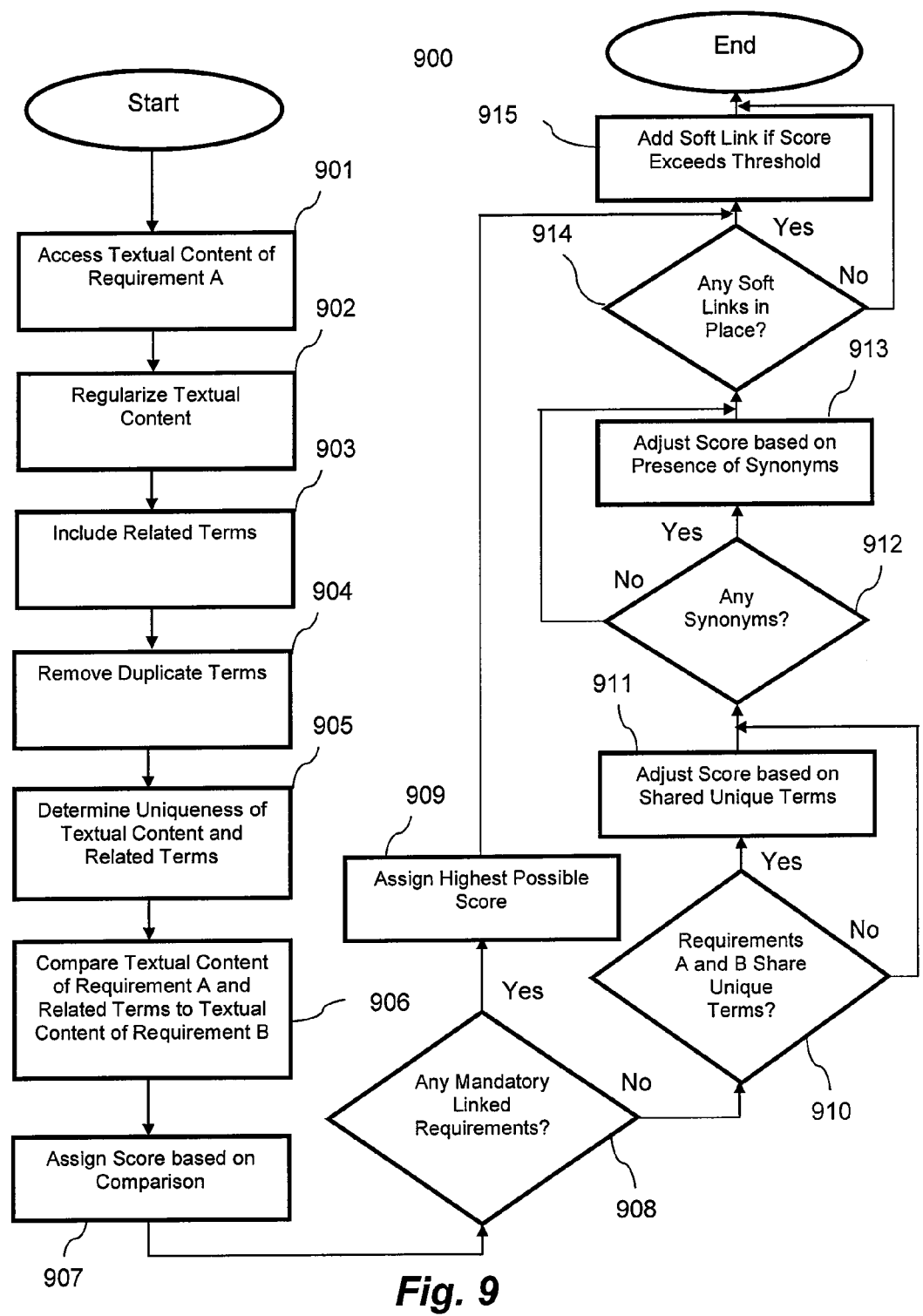
FIG. 9 depicts an exemplary process for assigning soft links.

Returning to step 704 of process 700, soft links are located and/or created in requirements databases and are used to provide scores that reflect the relationship between two or more related requirements. In one embodiment, for example, soft links may be created based upon textual matches between two or more requirements where the number of common terms exceeds a certain threshold. In other embodiments, soft links may be created based upon textual matches between two or more requirements after related terms (e.g., from a semantic network database) are identified and included. Other more complex embodiments are possible as well. For example, FIG. 9 depicts an exemplary process 900 of assigning soft links based on scores.

Process 900 may include a step 901 of accessing textual content of a first requirement (called, e.g., "Requirement A"). The textual content of Requirement A may include the text (e.g., words and numbers) included in the requirement, as well as any metadata associated with the requirement. With reference to FIGS. 1A and 1B, Requirement A may be stored in, e.g., databases 101.

Process 900 may also include a step 902 of regularizing textual content from Requirement A. The regularization of content may involve, for example, removing misspellings, removing grammatical errors, including plural variations, removing capital letters, etc. Regularization may occur automatically, by user election, or both.

In some embodiments, process 900 may also include a step 903 of including related terms. For example, requirements terms may have related terms determined by subject matter experts or technicians, or via automated techniques. In some embodiments, step 903 parses the textual content of Requirement A, and determines if any related terms are available based on the content of Requirement A. For example, with reference to FIGS. 1A and 1B, related terms may be provided by semantic network database 102. Step 903 may include the related terms in a temporary memory (e.g., RAM, flash memory) for use in performing process 900, or in a more permanent memory (e.g., requirements databases).

Process 900 may also include a step 904 of removing duplicate terms. For example, if duplicate terms are present in Requirement A, duplicates may be removed in step 904. Also, if the inclusion of related terms in step 903 results in the presence of duplicate terms, duplicates may be removed in step 904. In some embodiments, inclusion rules may function to prevent duplicate terms from being removed (e.g., if a duplicate term is subject to a special operator). Also, in some embodiments, duplicate terms may be removed automatically, and in further embodiments duplicate terms may be removed upon user election.

In some embodiments process 900 may include a step 905 of determining uniqueness of the textual content of Requirement A and related terms, if any. For example, uniqueness may be quantified by determining the frequency of incidence of terms within a data source (e.g., requirements databases, dictionaries, glossaries, etc.). In some embodiments, terms may be deemed unique if their quantified uniqueness exceeds a uniqueness threshold (e.g., 10/1000). In further embodiments, every term may be given a uniqueness ranking.

Process 900 may also include a step 906 of comparing the textual content of Requirement A and related terms to the textual content of Requirement B. For example, step 906 may compare Requirement A and related terms with every other requirement in one or more requirements databases (e.g., Requirement B, Requirement C, Requirement D, etc.). In other embodiments, step 906 may compare Requirement A and related terms with only certain other requirements (e.g., requirements sharing at least one term in common with Requirement A or related terms, requirements sharing at least one non-common word with Requirement A or related terms, requirements being classified as within the same subject matter domain as Requirement A, etc.). The comparison of Requirement A and related terms to Requirement B may comprise determining the number of words the two requirements (and related terms) have in common. Step 906 may also comprise determining which words the two requirements have in common, how many times certain words are repeated in each requirement, etc.

In some embodiments, process 900 may also include a step 907 in which a score may be assigned to the relationship between Requirement A and Requirement B. For instance, the score may be proportional to the number of terms shared by Requirement A and related terms and Requirement B. As also discussed above, the score may be increased based on, e.g., the number of synonyms shared by Requirement A and related terms and Requirement B. The score may be expressed as, e.g., a percentage, a number range (e.g., 1-100), etc.

Process 900 may also include a step 908 of determining whether Requirements A and B are mandatory linked requirements. Mandatory linked requirements, for instance, may include two or more requirements that are determined to be linked as necessarily related (e.g., left and right headlight assemblies, fuel type and engine efficiency, battery size and battery life, etc.). Mandatory linked requirements may be identified by subject matter experts, technicians, automated methods, etc. Mandatory linked requirements may also be specified by contracts, regulations, statutes, etc. In some embodiments, if Requirement A and B are determined to be mandatory linked requirements, the highest possible score may be given to their relationship in a step 909. For instance, in a scoring system with numerical scores between 1-100, the relationship between Requirements A and B may be given a score of 100. Process 900 may then proceed to step 915, as discussed further below.

If Requirements A and B are not determined to be mandatory linked requirements in step 908, process 900 may proceed to a step 910 of determining whether Requirement A and Requirement and B share any unique terms. Unique terms, and degrees of uniqueness, may be determined in, e.g., step 905. If step 910 determines that Requirement A and related terms share one or more unique terms with Requirement B, the score for the relationship between Requirements A and B may be adjusted in a step 911. For example, the score may be increased in proportion to the number of shared terms determined to be unique, in proportion to the uniqueness of each term, in proportion to only unique terms with levels of uniqueness exceeding a threshold, etc. For example, as discussed above, point quotas may be used, such that the more unique a term is the more points will be added to the score. Accordingly, more instances of unique terms, and terms with higher uniqueness rankings, may results in higher scores.

If step 910 determines that Requirement A and any related terms and Requirement B share no unique terms, or the score adjustment routine of step 911 has completed, process 900 may proceed to a step 912. In some embodiments, step 912 may determine whether any synonyms are present in Requirement A and related terms and in Requirement B. Synonyms may be determined by subject matter experts, by technicians, or by automated means (e.g., by referring to thesauruses, glossaries, dictionaries, etc.). The score between Requirements A and B may be adjusted in proportion to the number of shared synonyms in a step 913. In some embodiments, step 912 may determine whether shared synonyms are also unique terms (e.g., as determined by step 905). If, for example, the terms "website" and "webpage" were determined to be synonyms in a particular set of requirements, and were also determined to be unique terms in the set of requirements, an extra adjustment may be made to the score in a step 913.

If step 912 determines that no synonyms are present in Requirement A and related terms and Requirement B, or the routine of adjusting a score based on synonyms in step 913 has concluded, process 900 may proceed to a step 914. In some embodiments step 914 may involve determining whether Requirements A and B are linked via soft links. If a soft link has already been established for Requirements A and B (e.g., through a previous execution of process 900), process 900 may terminate.

If a soft link has not yet been established for Requirements A and B, a soft link may be added in a step 915. For example, step 915 may determine whether to add a soft link between Requirements A and B based on the score assigned in step 907, and modified, if at all, in steps 909, 911, and/or 913. In some embodiments, for example, only the top ten percent of scores may exceed a threshold in step 915, such that they will be soft linked. In other embodiments, a threshold may specify that only scores 80 and above will result in soft links to be added. In further embodiments, soft links may be generated with a strength according to the score determined in process 900. In this way, soft links between requirements with higher scores may be stronger (e.g., express a closer relationship) than soft links between requirements with lower scores. In such an embodiment, soft links may be assigned to some or all requirement combinations analyzed in process 900.

With reference again to FIG. 7, process 700 may also include a step 705 of displaying requirement data based on soft links between requirements. For example, given certain search terms by a user, step 705 may display for the user requirements deemed to be related to the search terms. In some embodiments, as depicted in FIG. 9, requirement data to be displayed may be determined through a process of comparing requirement textual content and related terms to other requirement data. Scores may be developed to represent the relationship between different requirements, and soft links may be added between different requirements in accordance with the scores. In some embodiments, step 705 may present all requirements that are soft linked. In further embodiments, step 705 may present all requirements with soft link strengths exceeding a particular threshold. In other embodiments, step 705 may present some or all requirements in order of their score, from highest to lowest.

Figure 10:
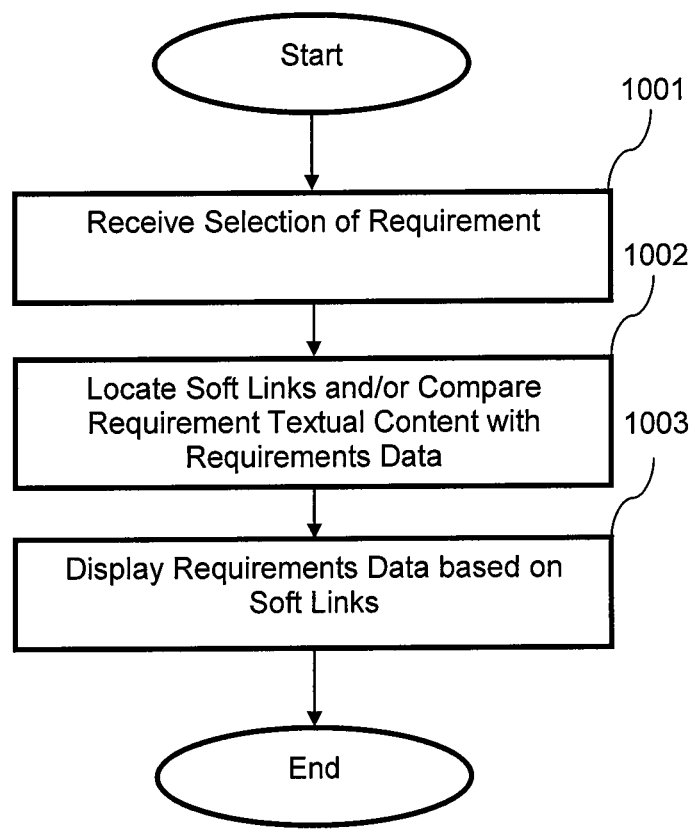
FIG. 10 depicts an exemplary process for searching for requirement data.

FIG. 10 depicts an exemplary process 1000 of searching for requirements data. Process 1000 may include a step 1001 of receiving a selection of a requirement. Thus, unlike exemplary processes 200 and 900, process 1000 may receive a requirement rather than text as a search query. In some embodiments, step 1001 may receive both a selection of a requirement and textual search terms (e.g., words and/or numbers). In further embodiments, step 1001 may include receiving a selection of more than one requirement.

Process 1000 may also include a step 1002 of locating any soft links between the requirement(s) received in step 1001 and/or comparing requirement textual content with requirements data. For example, locating soft links between the selected requirement(s) and other requirements may comprise querying requirements databases and/or semantic network databases for such soft links. Such a process may be performed, e.g., as described above with reference to FIG. 9. Also, comparing requirement textual content with requirements data may include querying requirements databases and/or semantic network databases, e.g., as described above with reference to FIG. 2. In some embodiments, where the selection in step 1001 includes both one or more requirements and textual search terms, step 1002 may both locate soft links and compare search text with requirements data to find related requirements, as discussed above. In some embodiments, for example, aspects of both process 200 and process 900 may be utilized.

Figure 11A:
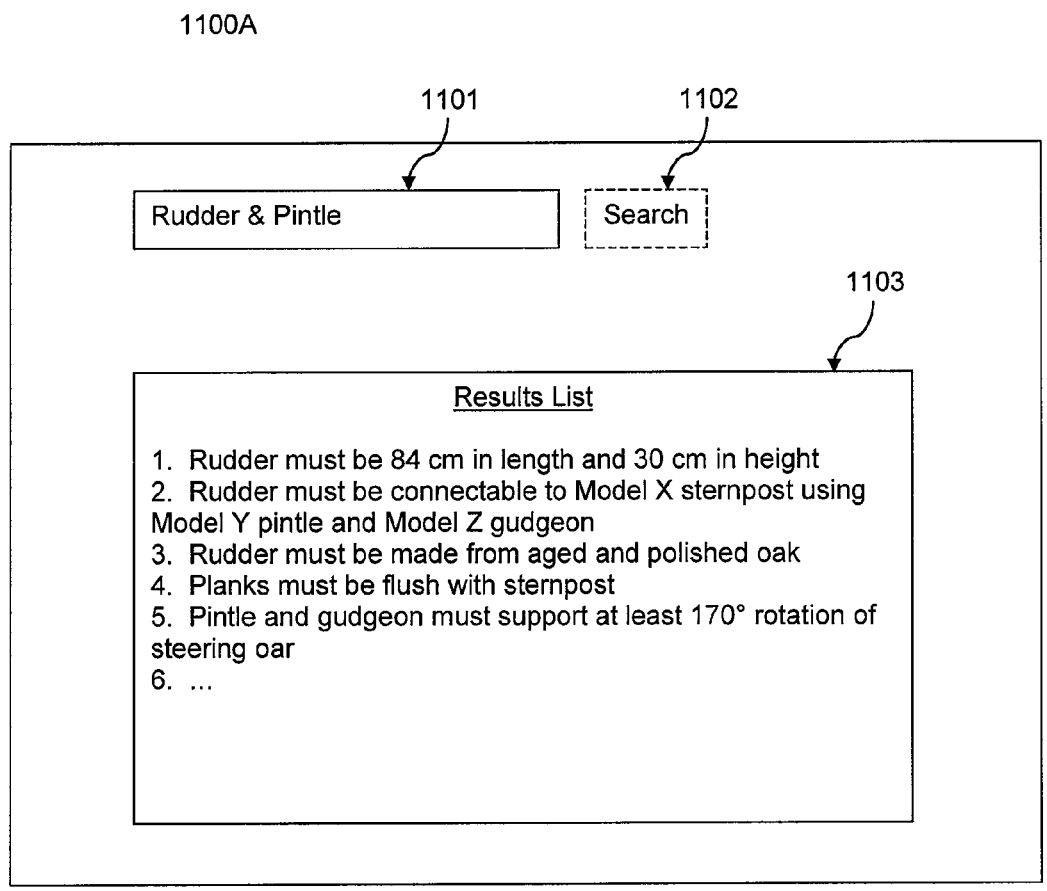
FIG. 11A depicts an exemplary user interface for searching requirement data.

FIG. 11A depicts an exemplary user search interface 1100A. In some embodiments, interface 1100A may include a search query field 1101. As described above, users may input text (e.g., words and/or numbers) in field 1101, and/or Boolean operators, special operators, requirement reference numbers, etc. In some embodiments, field 1101 may include a drop down list of requirements from which users may select one or more requirements.

Interface 1100A may also include a search button 1102. In some embodiments, selection of button 1102 may cause interface 1100A to connect to one or more databases (e.g., requirements databases, semantic network databases, etc.), if not already connected. For example, with reference to FIGS. 1A and 1B, selection of button 1102 may cause interface 1100A to connect to databases 101 and semantic network databases 102. In further embodiments, selection of button 1102 may cause interface 1100A to execute queries in one or more databases according to the search content provided in field 1101. As discussed above, such content may include search text, specific requirements, search operators, etc.

In some embodiments, a results list window 1103 may be included in, or in conjunction with (e.g., in a separate window), interface 1100A. For example, window 1103 may list requirements identified according to the search content input in field 1101. As depicted in FIG. 11A, requirements in window 1103 may be listed as full text requirements. In further embodiments, results in window 1103 may be identified by a requirement number, a unique identifier in a table, a memory location, a database location (e.g., in requirements databases), etc. In embodiments where requirements are identified according to scores, soft link strengths, or rankings, as discussed above, requirements may be displayed in order of their score, soft link strength, ranking, etc., in window 1103. For example, in embodiments where mandatory linked requirements are identified, mandatory linked requirements may be listed first in window 1103, followed by other requirements in order of score, etc.

Figure 11B:
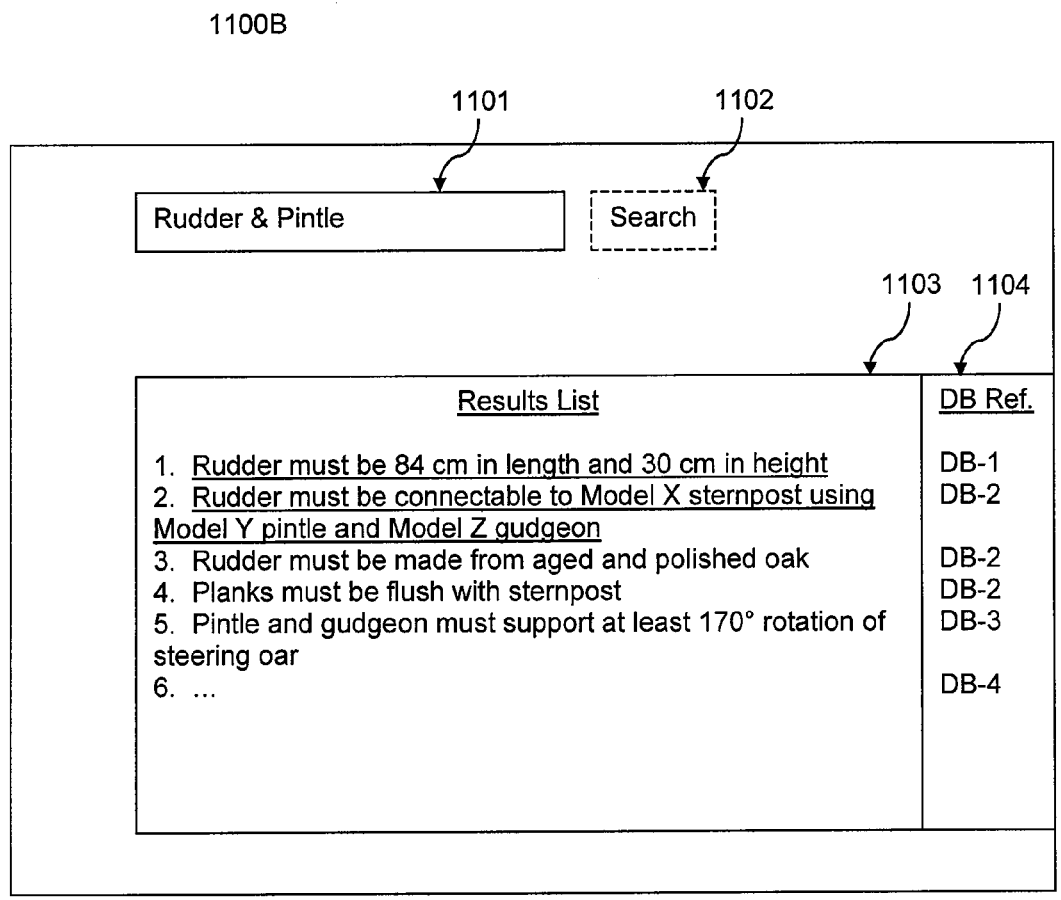
FIG. 11B depicts an exemplary user interface for searching requirement data.

In some embodiments, as depicted in FIG. 11B, interface 1100B may include a reference data field 1104. Field 1104 may display, e.g., database reference number, as illustrated in FIG. 11B. For example, database reference numbers may indicate which database a requirement comes from (e.g., the database in which the requirements is stored). Field 1104 may also include other reference information, such as the date a requirement was last updated, the author of the requirement, a code indicating the subject matter domain of the requirement, numbers representing the number of other requirements with which the requirement is soft linked, etc., as well as combinations of the foregoing.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising at least one computer processor for analyzing requirements data, comprising:
   a requirements database storing partially-structured data related to a subject matter domain; and
   an analytic tool, comprising:
   a user interface configured to receive a query from a user; and
   an analyzer configured to:
   parse the query into a plurality of search terms;
   identify a first requirement from the requirements database based on a degree of relatedness between the plurality of search terms and the textual content of the first requirement;
   identify a plurality of soft links between the first requirement and a plurality of related requirements, wherein each of the plurality of soft links represents a relatedness score between the first requirement and a related requirement from the plurality of related requirements, and each of the relatedness scores exceeds a threshold;
rank the plurality of related requirements based on their relatedness scores; and provide the highest ranked requirement to the user.

2. The system of claim 1, wherein the analyzer is configured to provide a plurality of requirements to the user in an order based on their relatedness scores.

3. The system of claim 1, further comprising a semantic network comprising a database linking partially-structured data related to the subject matter domain to related requirements data.

4. The system of claim 1, wherein the partially-structured data comprises requirements related to the subject matter domain.

5. The system of claim 1, wherein the plurality of soft links are determined by a subject matter expert or technician.

6. The system of claim 1, wherein the ranked requirements are presented to the user via the user interface in order of their rank.

7. The system of claim 1, wherein the analyzer locates a mandatory requirement in the requirements database related to the first requirement based on a mandatory link between the mandatory requirement and the first requirement.

8. The system of claim 7, wherein the analyzer provides the mandatory requirement to the user.

9. A computer-implemented method for analyzing requirements data, comprising:
   receiving a search query comprising search terms;
   identifying a first requirement based on a degree of relatedness between the search terms and the textual content of the first requirement;
   identifying a plurality of soft links between the first requirement and a plurality of related requirements, wherein each of the plurality of soft links represents a relatedness score between the first requirement and a related requirement from the plurality of related requirements, and each of the relatedness scores exceeds a threshold;
   ranking the plurality of related requirements based on their relatedness scores; and
   providing the highest ranked requirement to a user via a computer device.

10. The computer-implemented method of claim 9, wherein the computer device comprises a search interface configured to receive the search query, connect to a requirements database and provide requirements to the user.

11. The computer-implemented method of claim 9, further comprising:
   presenting a plurality of requirements from the plurality of related requirements to the user via the computer device in accordance with their rankings.

12. The computer-implemented method of claim 9, further comprising identifying a mandatory requirement related to the first requirement based on a mandatory link between the mandatory requirement and the first requirement.

13. The computer-implemented method of claim 9, further comprising adding a related term to the search query that is determined by a subject matter expert or technician to be related to a search term.

14. The computer-implemented method of claim 9, wherein the first requirement comprises a term that is a synonym of a term in the highest ranked requirement.

15. A computer-implemented method for analyzing requirements data, comprising:
   receiving a search query comprising a first product requirement;
   comparing, using a computer processor, the textual content of the first product requirement to a requirements database;
   identifying, using the computer processor, a second product requirement in the requirements database, wherein the second product requirement has at least one term in common with the textual content of the first product requirement;
   identifying, using the computer processor, a plurality of soft links between the second product requirement and a plurality of linked product requirements wherein the plurality of linked product requirements do not include the at least one term in common with the textual content of the first product requirement, and wherein the plurality of soft links represent a relatedness score between the second product requirement and a plurality of related requirements from the plurality of linked product requirements, and each of the relatedness scores exceeds a threshold;
   ranking the plurality of related requirements based on their relatedness scores;
   and providing the highest ranked product requirement to a user via a computer device.

16. The computer-implemented method of claim 15, wherein the plurality of soft links are determined by a subject matter expert or technician.

17. The computer-implemented method of claim 15, wherein identifying a second product requirement in the requirements database comprises identifying a product requirement in the requirements database that has at least a number of terms in common with the textual content of the first product requirement that exceeds a threshold.

18. The computer-implemented method of claim 15, wherein the relatedness scores are associated with strengths of a relationship between the second product requirement and the third product requirement.

19. The computer-implemented method of claim 15, wherein the plurality of soft links are stored in a semantic network database.

20. The computer-implemented method of claim 19, wherein the semantic network database is stored in a requirements database.

21. A non-transitory computer-readable storage medium comprising a plurality of code segments, comprising:
   a code segment for receiving a search query comprising search terms;
   a code segment for identifying a first requirement from a requirements database based on a degree of relatedness between the search terms and the textual content of the first requirement;
   a code segment for identifying a plurality of soft links between the first requirement and a plurality of related requirements, wherein each of the plurality of soft links represents a relatedness score between the first requirement and a related requirement from the plurality of related requirements, and each of the relatedness scores exceeds a threshold;
   a code segment for ranking the plurality of related requirements based on their relatedness scores; and
   a code segment for providing the highest ranked requirement to a user via a computer device.

22. The non-transitory computer-readable storage medium of claim 21, further comprising:
   a code segment for providing a plurality of ranked requirements to the user in accordance with their rankings.

23. The non-transitory computer-readable storage medium of claim 21, further comprising:
   a code segment for locating a mandatory requirement in the requirements database related to the first requirement based on a mandatory link between the mandatory requirement and the first requirement.

24. The system of claim 1, wherein identifying the highest ranked requirement from the plurality of related requirements further comprises accessing a term cluster, wherein the terms in the term cluster are associated with parts in the product, and the terms in the term cluster are related to each other based on the physical proximities of the parts in the product.

25. The system of claim 1, wherein identifying the highest ranked requirement from the plurality of related requirements further comprises accessing a term cluster, wherein the terms in the term cluster are associated with parts in the product, and the terms in the term cluster are related to each other based on their likelihood of needing replacement or adjustment.

26. The system of claim 1, wherein identifying the highest ranked requirement from the plurality of related requirements further comprises accessing a term cluster, wherein the terms in the term cluster comprise linked pairs of synonyms.

* * * * *